(No Model.)  W. H. THURMOND.  3 Sheets—Sheet 1.
CAR COUPLING.
No. 350,645.  Patented Oct. 12, 1886.
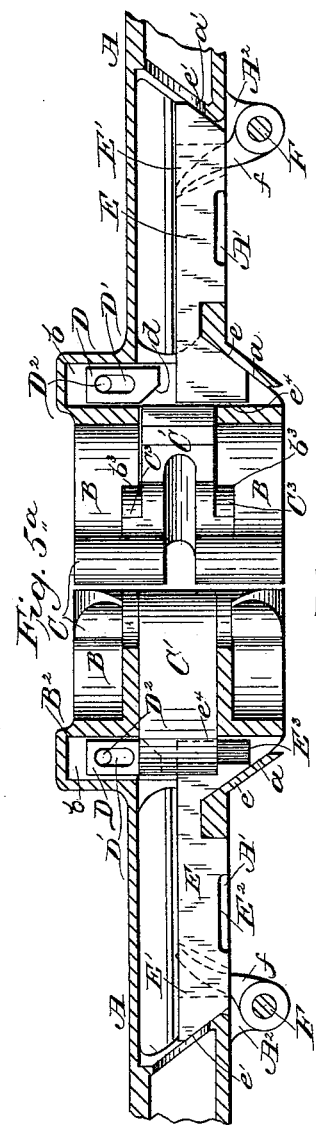
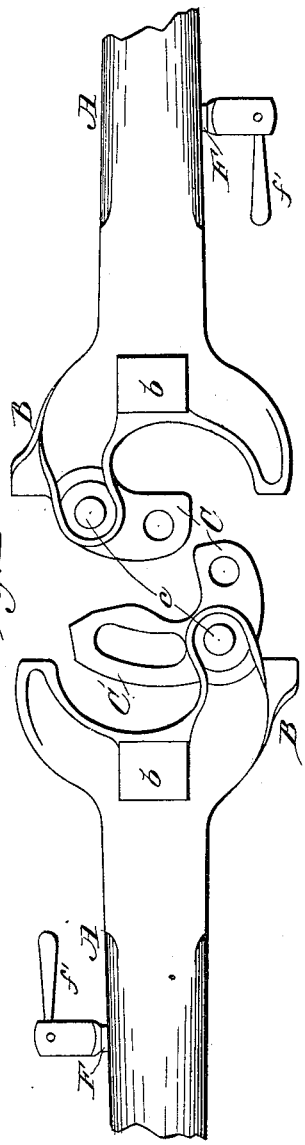
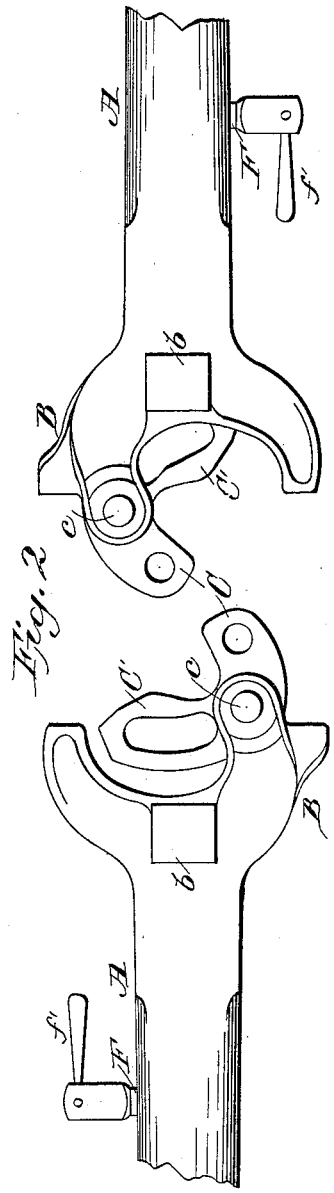
Attest
C. Mc. Gallaher
W. R. Davis
Inventor
William H. Thurmond
Henry W.
Atty (No Model.) 3 Sheets—Sheet 2.
W. H. THURMOND.
CAR COUPLING.
No. 350,645. Patented Oct. 12, 1886.
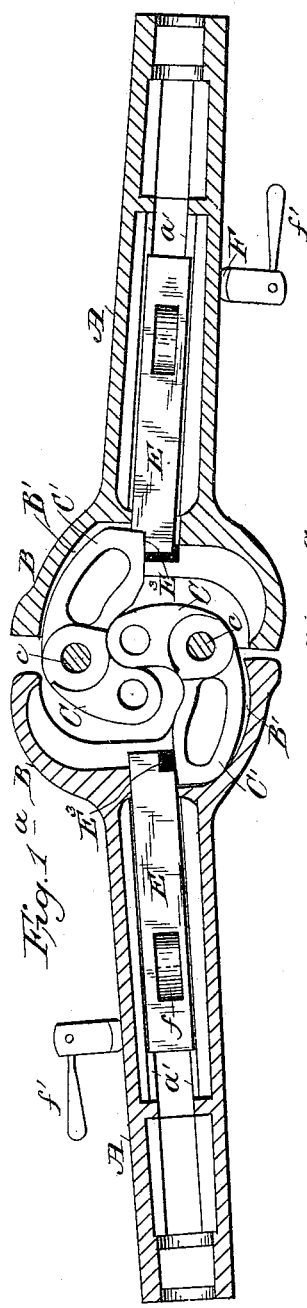
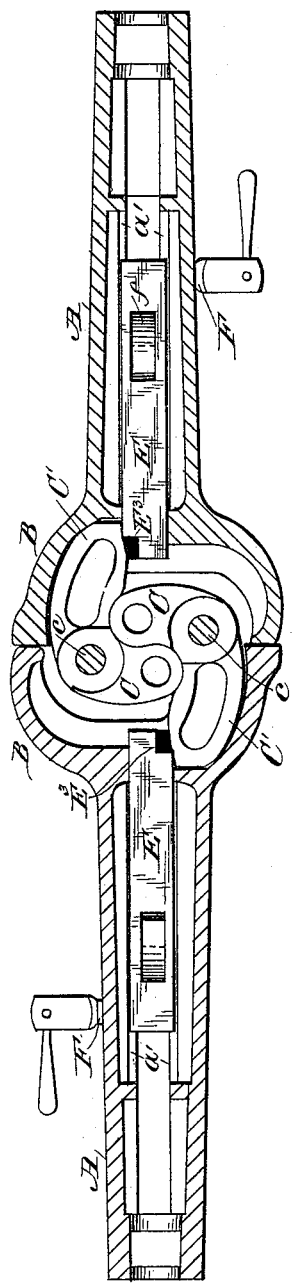
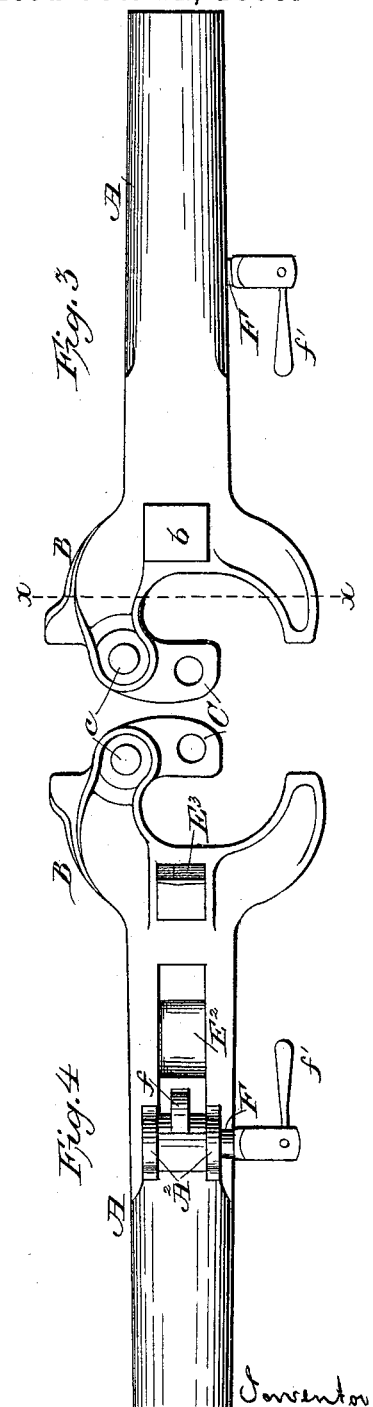

(No Model.) 3 Sheets—Sheet 3.
W. H. THURMOND.
CAR COUPLING.
No. 350,645. Patented Oct. 12, 1886.
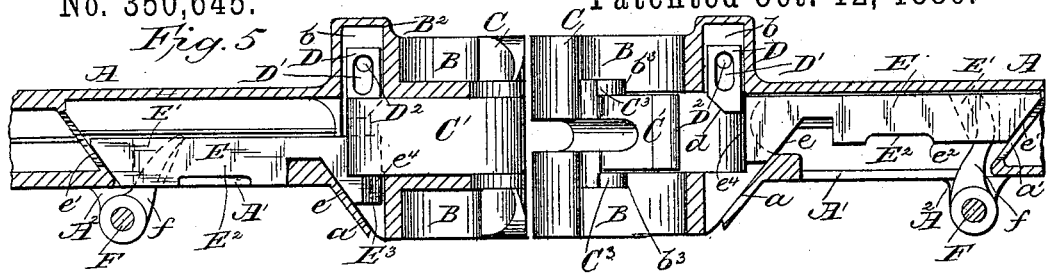
Fig. 5
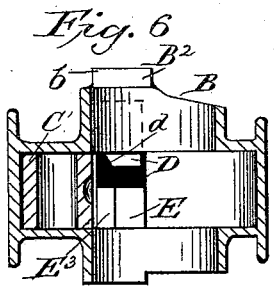
Fig. 6
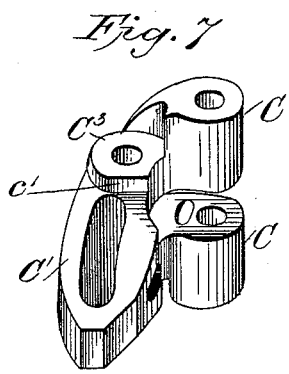
Fig. 7
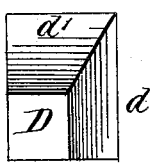
Fig. 8ª
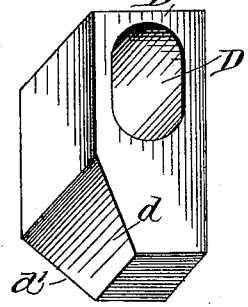
Fig. 8
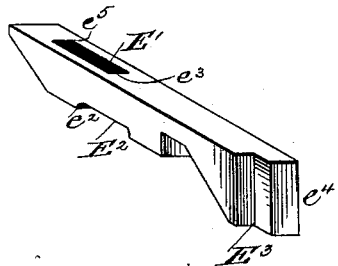
Fig. 9
Attest
C. M. Gallaher
Wm. R. Davis.
Inventor
William H. Thurmond
per Henry Orth
Atty

UNITED STATES PATENT OFFICE.

WILLIAM H. THURMOND, OF FORSYTH, GEORGIA, ASSIGNOR TO THE THURMOND CAR COUPLING COMPANY.

CAR-COUPLING.

SPECIFICATION forming part of Letters Patent No. 350,645, dated October 12, 1886.

Application filed July 28, 1886. Serial No. 209,316. (No model.)

*To all whom it may concern:*

Be it known that I, WILLIAM H. THURMOND, a citizen of the United States, residing at Forsyth, in the county of Monroe and State of Georgia, have invented certain new and useful Improvements in Car-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Referring to the accompanying drawings, Figure 1 is a top plan view of two couplers shown as in the act of approaching each other for coupling, the hook of the coupler on the left being released from the thrust-bar and the hook of the coupler on the right being locked in position by said thrust-bar. Fig. 2 is a like view showing the two hooks released from the thrust-bar and swung out of the draw-head. Fig. 1ª is a horizontal longitudinal section of two draw-bars or couplings with the coupling devices in their respective positions when coupled on a curve. Fig. 2ª is a like view showing the coupling devices in their respective positions when coupled on a straight line of track. Figs. 3 and 4 are top and bottom plan views of one of the draw-bars or couplings. Fig. 5 is a vertical longitudinal section of two draw-bars or couplings shown in the act of coupling, the hook of the coupler on the left being locked in position by the thrust-bar while the thrust-bar of the coupler on the right is held against forward movement by its locking-block, the hook being free to swing on its pivot. Fig. 5ª is a like view showing the thrust-bar in its normal position, the hook being swung out ready for coupling. Fig. 6 is a vertical transverse section of one of the draw-bars, taken on line *x x* of Fig. 3. Fig. 7 is a detached isometric view of one of the coupling-hooks. Fig. 8 is a like view of the gravital locking-block. Fig. 8ª is an under side plan view thereof, and Fig. 9 is also an isometric view of the gravital thrust or locking-bar.

This invention relates to that class of car-couplings commonly known as "twin" or "hook" couplers.

One of the great difficulties encountered in this class of couplers is to effect the coupling of cars on sharp curves. This difficulty I have overcome by forming a vertical notch or recess in the shank of the hook to permit the thrust-bar to engage said shank when the latter is not fully moved into its proper position in the draw-head, as described in Letters Patent granted to me under date of October 21, 1884, No. 306,876, and the reissued Letters Patent, dated July 7, 1885, No. 10,623. These difficulties I am also enabled to effectually overcome by forming a vertical notch in the outer end of the thrust or locking bar that locks the hook into position in coupling.

To facilitate the manipulation of the thrust-bar in uncoupling, and to bring the mechanism for manipulating said thrust-bar out of the way of the car-timbers, I arrange said devices underneath the draw-bar, instead of arranging the same on top thereof; and I also provide means whereby access may be had to the thrust-bar, and whereby any dirt or other obstructions that may find access into the draw-bar will find a ready egress therefrom.

In order to enable the hook-shank to automatically displace the locking-block for the thrust-bar either in coupling or uncoupling, I form on said locking-block two inclined or beveled faces, so that the hook-shank will lift the block either in moving out of or into the draw-head in uncoupling or in coupling.

To these ends the invention consists in the combination, with the rotatable hook, of a gravital thrust or locking bar having a vertical notch or recess in its outer end for engagement with the shank of the hook, substantially as hereinafter fully described.

The invention further consists in the combination, with the rotatable hook and a gravital thrust-bar or locking-bar having a vertical notch or recess in its outer end for engagement with the shank of the hook, of a gravital block having a portion of its front and one of its lateral faces beveled and operating to lock the thrust or locking bar out of engagement with the shank of the hook, substantially as hereinafter fully described.

The invention further consists in the combination, with the thrust-bar, of an operating lever or shaft located below the thrust-bar, substantially as hereinafter fully described.

The draw-bar, draw-head, and the coupling devices may be constructed as shown in the Letters Patent hereinbefore referred to, or they may be constructed as described in an application for Letters Patent of even date with this, Serial No. 209,315, and as shown in the accompanying drawings, or in any other preferred manner.

In the drawings, A indicates the draw-bar; B, the draw-head thereof; C, the coupling-hook; D, the gravital locking-block for the thrust-bar, and E the thrust-bar. These parts are arranged relatively to each other and co-operate in the following manner: The thrust-bar E has inclined bearing-surfaces $e$ $e'$, respectively, at its forward and rear end, and a vertical front face, $e^4$. The said inclined bearing-surfaces $e$ $e'$ lie and ride on corresponding bearing-surfaces, $a$ and $a'$, respectively, formed in the draw-bar A, which is preferably cast hollow throughout its length and has a longitudinal slot, A', in its under side. This slot serves a threefold purpose—namely, for the passage of the operating arm or lever for the thrust-bar at the rear end of the slot, as hereinafter described; as a hand-hole whereby access may be had to the thrust-bar for moving the same back in case of an accident to the operative device for said thrust-bar resulting from a collision, and, finally, for allowing free egress of any dust, dirt, or other impurities that may find access into the draw-bar.

The thrust or locking bar E has on its under side a recess, $E^2$, for the purpose of making it lighter by removal of a portion of the body of the thrust-bar at that point. The thrust-bar E is further provided with a longitudinal slot, E', the front wall, $e^3$, of which inclines rearwardly, while the rear wall, $e^4$, of said slot is vertical.

Upon opposite sides of the slot A' on the under side of the draw-bar A, and at the rear end thereof, are formed depending lugs $A^2$ $A^2$, in which is pivoted a shaft, F, that has a curvilinear radial arm, $f$, which arm extends through slot A' in draw-bar A into the slot E' in the thrust or locking bar E. When the thrust-bar has moved forward to lock the coupling-hook, the radial arm $f$ of shaft F rests on the inclined front wall, $e^3$, of the slot E' in the thrust-bar, as shown in dotted lines on the left in Fig. 5 and in Fig. 5ª, the thrust-bar being thus in a measure supported and held against accidental endwise or backward movement by the arm $f$.

The object in arranging the shaft F on the under side of the draw-bar instead of arranging the same at top, as described in the Letters Patent hereinbefore referred to, is twofold: First, in arranging the shaft on the under side of the draw-bar A it is out of the way of the car-timbers, as said shaft F is of such length that it may be rotated without going between the cars, a suitable crank, $f'$, being provided for the purpose, or a crank of sufficient length may be used with a short shaft for the same purpose; secondly, in the manipulation of the shaft the power exerted on the thrust-bar E by the radial arm is in an upward direction, thus tending to lift the bar off its bearings, requiring much less power to displace the bar in uncoupling than is required when the power is exerted in a downward direction by the arm $f$, which has the effect of forcing the bar onto its bearings and producing a great deal of friction, as will be readily understood. At its other end, and on the side facing the shank C' of the coupling-hook C, the thrust-bar E has a vertical recess, $E^3$, that engages the said shank when it is not fully moved back into the cavity or chamber B' of the head B, which occurs when two cars are coupled on a curve, as hereinafter referred to.

In a suitable cavity of chamber $b$, formed in or on the head B of the draw-bar A, is arranged a gravital block, D, that has a transverse slot, D', of greater vertical than horizontal diameter, so as to adapt said block to freely move vertically on its supporting pin or bolt $D^2$ within said cavity or chamber $b$. In the Letters Patent hereinbefore referred to I have shown this cavity as open at the top, and to prevent access of dust or dirt to said cavity or chamber I preferably close the same at top, as shown. The lower portion of the front face of the block D is beveled, as shown at $d$, and the corresponding portion of one of the lateral faces is also beveled, as shown at $d'$, the bevel or incline $d'$ being preferably made at a greater angle than that at $d$. The coupling-hook C is pivoted, as usual, in the draw-head B on a vertical pivot, $c$, on which it swings freely, the tail or shank thereof rotating in the path of the gravital block D, the hook proper being perforated for the reception of a coupling-pin, so that it may be coupled by means of a link to a car provided with the usual link-and-pin coupling.

The operation of the coupler may be briefly described as follows: Supposing two couplers fully coupled together, as shown in Fig. 2ª, if it is desired to uncouple, the shaft F is rotated in the proper direction toward the right or left, according as the coupling devices of the right or left hand coupler are to be operated. By so rotating the shaft F the radial arm $f$ will move the thrust-bar E vertically and longitudinally upon the incline bearing-faces $a$ and $a'$, whereby said thrust-bar is moved rearwardly. As soon as the thrust-bar has cleared the shank C' of the hook C, the draft thereon by the hook of the other coupling will draw the same out of the draw-head and the two coupling-hooks will move out of engagement, one of said hooks assuming the position of that shown on the left of Fig. 1 or of that shown in Fig. 2. As the coupling-hook moves out of the draw-bar, the front face of its shank C' impinges upon the incline d' of the gravital block D and lifts the same, and as soon as said hook has moved from under the block the latter drops down in front of the thrust-bar E and locks the same against forward movement, as shown in Fig. 5. The devices are thus automatically set for coupling, as it is obvious that when the coupling-hook of the right-hand coupler, Fig. 1, or that of the left-hand coupler, Fig. 4, moves into the draw-head B it will impinge upon the shank C' of the hook C, which has been swung out in uncoupling, and push said hook-shank into the cavity of the draw-head. In this movement of the hook-shank its rear face impinges upon the incline d of the locking-block D and lifts the same from in front of the thrust-bar E, and as soon as the said hook-shank has moved from in front of the bar the latter moves forward by gravity in front of the hook-shank and locks the same into position, the two hooks being fully locked together, as shown in Fig. 2ª.

I have stated above that in uncoupling the coupling devices are set for coupling by the manipulation of the shaft F. It will, however, be readily seen that the coupling will be effected whether the coupling devices are set, as shown in Fig. 5, on the right, or whether the thrust-bar lies in its normal position after the hooks have been swung out of the draw-head. Supposing that both hooks are in the position shown in Fig. 2 or fully swung out, the thrust-bars being in their normal position, as shown in Figs. 5 and 5ª, on the right, as the two coupling-hooks move into engagement with each other the hook of one will bear upon the shank of the other, both shanks moving inwardly. In this inward movement the ends of the shanks C' of the coupling-hooks will impinge upon the end of the thrust-bars and push the same rearwardly, and at the same time the rear face of said hook-shanks will impinge upon the incline d of their respective locking-blocks D and lift the same. As soon as the hook-shanks have moved inwardly far enough to clear their respective thrust-bars, the latter will move forward by gravity in front of the shanks and lock the same into position, as shown in Fig. 2ª. As the shanks move clear of the thrust-bars, they also move from under the locking-blocks D, for said thrust-bars, and these will fall down into position to be again lifted by the shanks of the hooks in uncoupling to lock the thrust-bars into the positions shown in the right of Fig. 5, and as above described. It will thus be seen that the coupler is in every sense an automatic one, and that the coupling may be effected whether the thrust-bar is held back by the locking-block D or not, provided one or both the hooks have been moved out and clear of said thrust-bar, as described.

To insure the lifting of the block D by the hook-shank C' when the latter moves out of the draw-head, I form the incline d' on the rear face at a greater angle than the incline d on the front face thereof. When, however, the coupling is effected on a curve, the hooks approach each other on lines of a greater or less angle to the axial line of the draw-bars, and said shanks are not pushed into their respective draw-heads sufficiently far to clear the end of the thrust-bars, so that the latter cannot move forward to lock the shanks. This I effectually overcome by forming in the end of the thrust-bar the recess or notch E³, hereinbefore referred to, and I make this recess of such width or lateral depth that the hook-shanks will always clear the end of the thrust-bar, whatever the radius of the curve on which the cars may stand. In other words, the recess E³ is of such width as to reduce the area of the front face of the thrust-bar to such an extent that no matter to what extent the shank of the hook is moved inwardly it will always clear the reduced face or end of the thrust-bar E, and enable the latter to move forward the full extent of the depth of the recess E³, the parts assuming the position shown in Fig. 1ª. As the cars again enter upon a straight line of track, the draft of the hooks upon one another will cause the hook on the right to fully swing inward, and the thrust-bar will then complete its forward movement, the parts assuming the position shown in Fig. 2ª. I would also remark that the strength of the thrust-bar E is in no way impaired by recessing the same, since the said bar, whether in the position shown in Fig. 1ª or in that shown in Fig. 2ª, will always firmly bear against one side of the cavity or chamber in the draw-bar in which it is fitted, so that there is no danger in its being bent or broken.

I do not herein desire to claim the construction of the draw-bar, as this forms one of the subject-matters of the application for patent herein referred to. Nor do I desire to claim, broadly, herein the combination, with the coupling-hook, of a thrust-bar provided in its outer end with a notch or recess facing the shank of the hook, as I have claimed this in a separate application for patent, filed September 8, 1886, Serial No. 213,012.

Having now described my said invention and how the same is to be performed, what I claim, and desire to secure by Letters Patent, is—

1. In a coupler of the class described, the combination, with the coupling-hook arranged to oscillate or swing on a vertical pivot, of a thrust-bar provided in its front end with a notch or recess facing the shank of the hook, said thrust-bar having a motion across the plane of oscillation of the shank of the hook, and a locking-block for the thrust-bar provided with two inclines or beveled faces, and moving in a vertical plane, substantially as and for the purpose specified.

2. In a coupler of the class described, the combination, with the coupling-hook, of a block for holding the devices that lock the hook out of engagement therewith, said block having two of its faces beveled or provided with inclined bearing-surfaces, substantially as described, for the purpose specified.

3. In a coupler of the class described, the combination, with the coupling-hook, of a block for holding the devices that lock the hook out of engagement therewith, said block having two of its faces beveled or provided with inclined bearing-surfaces, one of said surfaces being formed at a greater angle than the other, substantially as described, for the purpose specified.

4. In a coupler of the class described, the combination, with the draw-bar, the gravital thrust-bar, and a shaft for operating said thrust-bar, of the gravital block D, substantially as and for the purpose specified.

5. In a coupler of the class described, the combination, with the draw-bar provided in its under side with an opening or hand-hole, of the thrust-bar E, arranged in said draw-bar, substantially as and for the purpose specified.

6. In a coupler of the class described, the combination of the draw-bar provided with a longitudinal slot in its under side and a shaft mounted in bearings depending from the under side of the bar, and carrying a radial arm projecting through the slot into said draw-bar, with a coupling-hook arranged to oscillate or swing on a vertical pivot on said draw-bar, a thrust-bar provided with a longitudinal slot for the reception of the radial arm of the said shaft and having a motion across the plane of oscillation of the shank of the hook, and a locking-block for the thrust-bar having a motion in a vertical plane, substantially as and for the purpose specified.

7. The combination, with the coupling-hook C and the thrust-bar E, of the gravital block D, provided with the beveled faces $d$ and $d'$, substantially as described, for the purposes specified.

8. The combination, with the draw-bar A, having a slot in its under side, and the thrust-bar E, having a longitudinal slot, E', of the shaft F, pivoted underneath the draw-bar and carrying a radial arm, $f$, that projects through slot A' into slot E' of the thrust-bar, substantially as and for the purpose specified.

In testimony whereof I affix my signature in presence of two witnesses.

WILLIAM H. THURMOND.

Witnesses:
W. D. GIBSON,
S. B. HEAD.